(12) United States Patent
Joshi et al.

(10) Patent No.: US 8,365,118 B2
(45) Date of Patent: Jan. 29, 2013

(54) BROKEN-SPHERES METHODOLOGY FOR IMPROVED FAILURE PROBABILITY ANALYSIS IN MULTI-FAIL REGIONS

(75) Inventors: Rajiv V. Joshi, Yorktown Heights, NY (US); Rouwaida N. Kanj, Round Rock, TX (US); Zhuo Li, Cedar Park, TX (US); Sani R. Nassif, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 12/477,361

(22) Filed: Jun. 3, 2009

(65) Prior Publication Data

US 2010/0313070 A1 Dec. 9, 2010

(51) Int. Cl.
*G06F 9/455* (2006.01)

(52) U.S. Cl. .......... 716/111; 716/112; 716/136

(58) Field of Classification Search .......... 716/111, 716/11, 112, 136
See application file for complete search history.

(56) References Cited

U.S. PATENT DOCUMENTS

| | | | | |
|---|---|---|---|---|
| 6,948,141 | B1 * | 9/2005 | Satya et al. | 716/52 |
| 7,380,225 | B2 * | 5/2008 | Joshi et al. | 716/56 |
| 2005/0273308 | A1 * | 12/2005 | Houston | 703/14 |
| 2006/0150129 | A1 * | 7/2006 | Chiu et al. | 716/4 |
| 2007/0044049 | A1 * | 2/2007 | Adams et al. | 716/4 |
| 2010/0313070 | A1 * | 12/2010 | Joshi et al. | 714/26 |

* cited by examiner

*Primary Examiner* — Thuan Do
*Assistant Examiner* — Mohammed Alam
(74) *Attorney, Agent, or Firm* — Eustus D. Nelson; Jack V. Musgrove (57) ABSTRACT

A failure probability for a system having multi-fail regions is computed by generating failure directions in a space whose dimensions are the system parameters under consideration. The failure directions are preferably uniform, forming radial slices. The failure directions may be weighted. The radial slices have fail boundaries defining fail regions comparable to broken shells. The distribution of the system parameters is integrated across the broken shell regions to derive a failure contribution for each failure direction. The failure probability is the sum of products of each failure contribution and its weight. Failure contributions are computed using equivalent expressions dependent on the number of dimensions, which can be used to build lookup tables for normalized fail boundary radii. The entire process can be iteratively repeated with successively increasing failure directions until the failure probability converges. The method is particularly useful in analyzing failure probability of electrical circuits such as memory cells.

25 Claims, 5 Drawing Sheets

BROKEN-SPHERES METHODOLOGY FOR IMPROVED FAILURE PROBABILITY ANALYSIS IN MULTI-FAIL REGIONS

BACKGROUND OF THE INVENTION

1. Field of the Invention

The present invention generally relates to the analysis of failure conditions in complex systems, and more specifically to a method of computing the failure probability for a system having multiple failure modes, particularly electrical circuits such as memory cells.

2. Description of the Related Art

Integrated circuits are used for a wide variety of electronic applications, from simple devices such as wristwatches to the most complex computer systems. Although great care is taken in the design and fabrication of integrated circuits, there is still a small percentage of electrical components that can fail for various reasons including process variations, defective designs or incomplete testing. Even if the percentage of failing components is very small, it may still equate to a significant number of absolute failures when considering components having a very large quantity of circuit elements. For example, an integrated circuit (IC) chip for a state-of-the-art static random-access memory (SRAM) array may have millions of memory cells (bits). Fails are rare in such memory designs but, unlike logic circuitry, a single or a few failing memory cells can lead to significant yield loss.

Means have been devised to mitigate the effects of component failures, such as the provision of error-correcting circuits or redundant circuits which enable recovery for a limited number of fails. However, with designers aiming for less than one part-per-million fails in memory designs, it is increasingly important to understand the failure mechanisms, and take into consideration the impact of process variation parameters on yield and design considerations. This challenge is becoming more difficult as process technology scales to the deep-submicron regime.

In the case of memory circuits, designers are particularly interested in process variation within the transistors of the memory cells. For example, variability and mismatch between these devices can lead to fails. Traditional sensitivity analysis techniques such as FORM (first order reliability method) are useful in estimating the probability of failure in memory systems when fails are attributed to a single failure mode (single-fail regions), but these techniques become problematic for more complicated systems with multiple failure modes (multi-fail regions).

Convex hull (or convex envelope) analysis uses a set of points in the space defined by the parameters of interest to construct a closed fail boundary for the system. While convex hull analysis is straightforward for two dimensions, it is computationally expensive to construct the envelope in higher dimensions, and further requires additional numerical integration of the variable distribution across the resulting structure.

The inscribed ellipsoid technique computes the dimensions of an ellipsoid of maximum volume which is bounded by failure sample points in the parametric space, but these computations also require computation of the hull in which the ellipsoid is inscribed. Inscribed ellipsoid further requires additional optimizations to be constructed after samples are available.

Figure 1A:
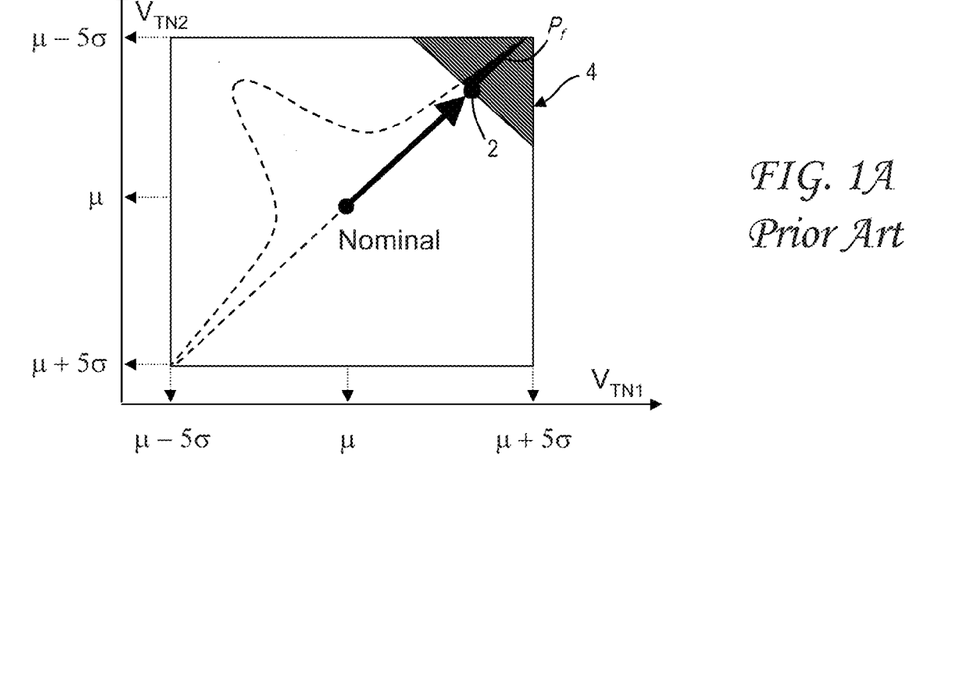
FIG. 1A is a graph illustrating an example of conventional probability failure analysis using the first order reliability method (FORM)

The FORM approach can be used to efficiently calculate the probability of failure $P_f$ for a system having a single failure mode. Failure is defined as a limit state function of the system variables which exceeds a given value. For electrical circuits a failing value may be established using circuit simulation tools. A generalized example of FORM is shown in the graph of FIG. 1A which represents a parametric space based on two threshold voltages $V_{TN1}$ and $V_{TN2}$ for respective devices in a memory cell. The center of the graph represents a nominal point of the limit state function corresponding to the mean values $(\mu_1, \mu_2)$ of the two voltage thresholds, which are assumed to have Gaussian distributions. In this example the failure mode is associated with a very high $V_{TN1}$ (around $+5\sigma_1$) and a very low $V_{TN2}$ (around $-5\sigma_2$). FORM computes a failure direction by locating the closest failing point 2 to the nominal point, and calculates a fail boundary as the line normal to this direction which also passes through the closest failing point 2. The hatched portion 4 in the upper right hand corner of FIG. 1A thus represents the single-fail region. The probability of failure according to this model is computed as the integral of the distribution function over this region. For a linear fail region boundary which is orthogonal to the closest failing point, the probably of fail can be estimated from the normalized distance to the closest failing point without need for integration. In a variation on this technique known as SORM (second order reliability method), a nonlinear (parabolic) fail boundary is computed to fit the curvature of a set of closest failing points.

Figure 1B:
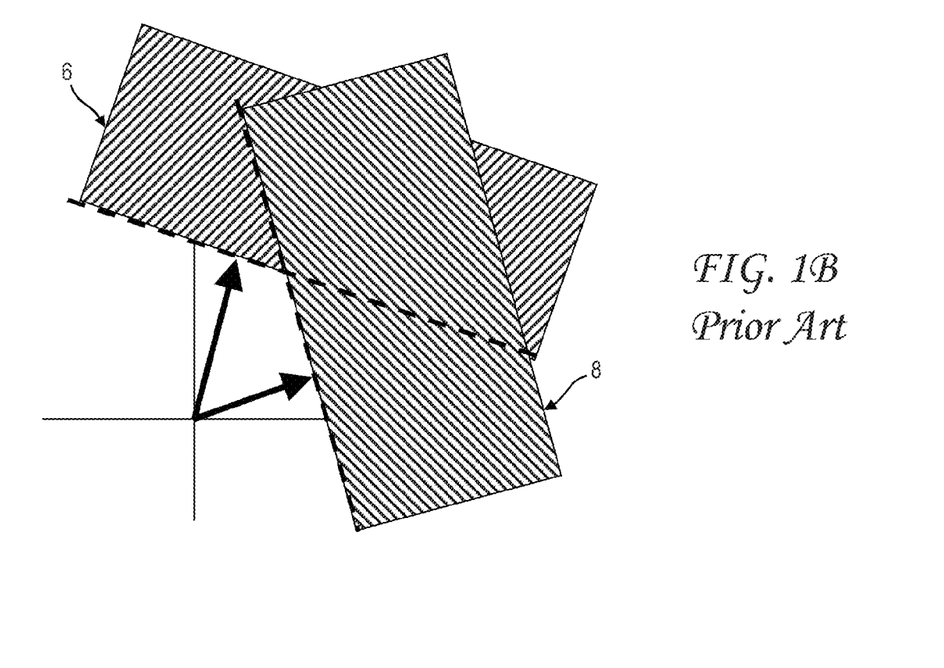
FIG. 1B is a graph illustrating overlapping fail regions for two failure directions modeled with FORM.

The problem with using FORM (or SORM) is that more complicated systems cannot be accurately represented by one simple fail boundary. Circuits such as memory cells can suffer multiple failure modes which would be modeled using multiple failure directions, as illustrated in FIG. 1B. For multiple directions, FORM estimates may have overlapping fail regions 6, 8, and as a result of this overlap it becomes impossible to use direct formulations for the failure probability. Instead, more expensive methods must be employed to integrate the pass/fail regions such as Monte Carlo. This problem becomes even more difficult as the number of variables increases and also as the number of fail boundaries that represent the system increases. The graph of FIG. 1B is two-dimensional, i.e., two variables, but accurate representation of a circuit may require a significantly higher number of variables. For example, it would be preferable to model at least six different variables for an SRAM cell corresponding to threshold voltages for the six different transistors that comprise the cell.

In light of the foregoing, it would be desirable to devise an improved method for estimating the failure probability in systems having multi-fail regions which did not require excessive computation. It would be further advantageous if the method could easily handle higher dimensions of the parametric space, i.e., many different process variables.

SUMMARY OF THE INVENTION

It is therefore one object of the present invention to provide an improved method of estimating failure probability in a system having multi-fail regions.

It is another object of the present invention to provide such a method which does not require excessive computational overhead.

It is yet another object of the present invention to provide such a method which may be used for systems having many process variation parameters.

The foregoing objects are achieved in a method for determining a failure probability of a system having multiple failure modes associated with a plurality of system parameters, by generating a plurality of failure directions in a parametric space whose dimensions correspond to the system parameters with each failure direction having an associated radial slice, identifying fail boundaries for each of the radial slices with broken shell regions extending beyond the fail boundaries, integrating a distribution of the system parameters across the broken shell regions to derive a failure contribution for each failure direction, and computing the failure probability as the sum of the failure contributions. The failure directions can be distributed uniformly within the parametric space, i.e., the radial slices have uniform angular widths (normalized radial slices would approximately equally partition the unit spheroid, i.e., the normalized directions have their tips uniformly spread on the surface of the unit spheroid). In a preferred implementation the failure directions are weighted for the failure probability computation. The weight assigned to a given direction can be used to correct for deviations from a true uniform spread of directions resulting from the actual direction spread not being perfectly uniform, or to analyze a particular non-uniform direction spread that may be more favorable for a given system under study based on prior knowledge. Failure contributions of a given failure direction can be computed as fractions of equivalent expressions for the integral function which depend on the number of dimensions; the integral function assumes that all fails are external to the full spheroid whose radius equals that of the failing distance for the specific failure direction. These equivalent expressions can be used a priori to build lookup tables whose entries are failure distribution values corresponding to discrete fail boundary radii (the normalized distance from a nominal origin of the parametric space to the fail boundary for a given failure direction/slice). The entire process can be iteratively repeated with successively increasing failure directions (e.g., 100, 500, 1000, 1500) until the failure probability converges.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 2:
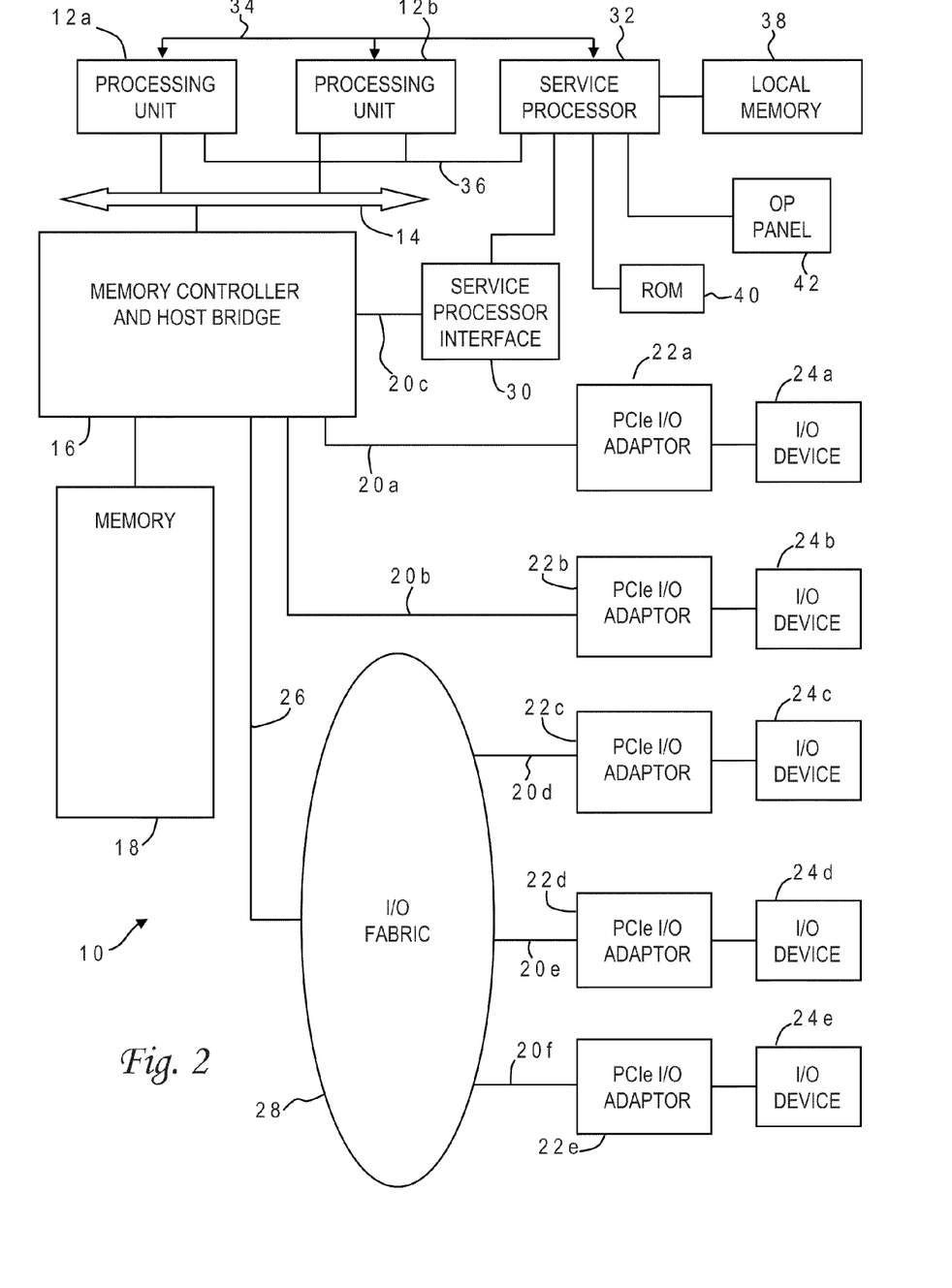
FIG. 2 is a block diagram of a computer system programmed to carry out failure analysis in accordance with one embodiment of the present invention.

With reference now to the figures, and in particular with reference to FIG. 2, there is depicted one embodiment 10 of a computer system in which the present invention may be implemented to carry out failure probability analysis of systems, including integrated circuit designs and particularly memory circuits. Computer system 10 is a symmetric multi-processor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe)link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the failure probability analysis application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

While the illustrative implementation provides program instructions embodying the present invention on disk drive 36, those skilled in the art will appreciate that the invention can be embodied in a program product utilizing other computer-readable storage media excluding transitory media such as propagating signals. The program instructions may be written in the C++ programming language for an AIX environment. Computer system 10 carries out program instructions for a failure probability computation that uses novel failure mode representations to manage systems having multi-fail regions. Accordingly, a program embodying the invention may include conventional aspects of various statistical tools, and these details will become apparent to those skilled in the art upon reference to this disclosure.

Figure 3:
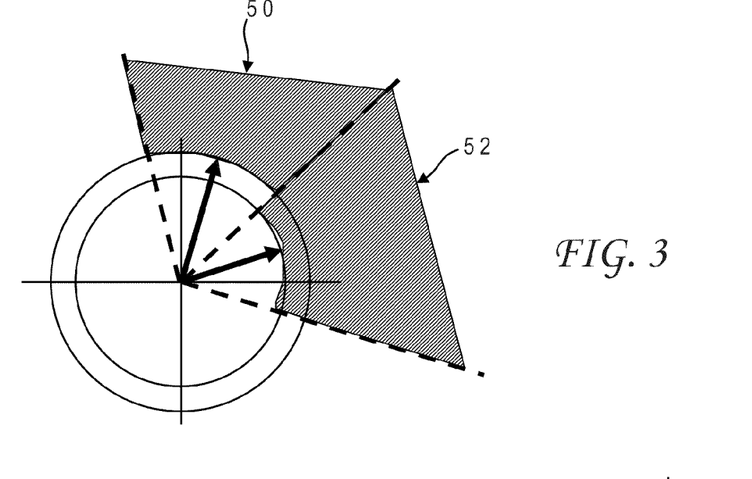
FIG. 3 is a graph illustrating non-overlapping fail regions for two failure directions modeled in accordance with one implementation of the present invention.

The present invention is particularly suited for computation of failure probability in systems having multi-fail regions. As discussed in the Background section, prior art techniques such as FORM cannot handle multiple failure directions due to the overlap in the resulting fail regions. The present invention avoids any such overlap using a novel approach which breaks up the fail regions around a set of fail directions. In the preferred implementation the invention relies on polar coordinates as illustrated in FIG. 3. This basic example utilizes two fail directions for comparison purposes to the fail directions depicted in the FORM representation of FIG. 1B, i.e., the fail directions in both figures are the same vectors. However, in FIG. 3 the fail directions are used to construct radial slices, and each fail direction has an associated arcuate fail boundary to define two non-overlapping fail regions 50, 52.

The graph of FIG. 3 is two-dimensional, but the present invention contemplates higher dimensions equal to the number of variables under consideration. For a Gaussian distribution of variables, there is an existing formula for estimating the integral of the distribution over radial regions as a function of the number of dimensions. Applying this formula to failure analysis yields a failure probability f(R) for a given fail direction as $$f(R) \propto \int_R^\infty \rho^{N-1} e^{-\frac{\rho^2}{2}} d\rho \cdot \int_{a_1}^{b_1} \sin^{N-2}\varphi_1 \ldots \int_{a_{N-2}}^{b_{N-2}} \sin\varphi_{N-2}$$

where R is the radius of the given failure boundary (the length of the failure vector), N is the number of dimensions, $\rho$ is the radial coordinate of the polar coordinate system for the parametric space, and $\phi_1, \ldots, \phi_{N-2}$ are angular coordinates of the polar coordinate system for the parametric space. Although polar coordinates are preferred for these computations, those skilled in the art will appreciate that other coordinate systems may be used with appropriate transforms.

Figure 4A:
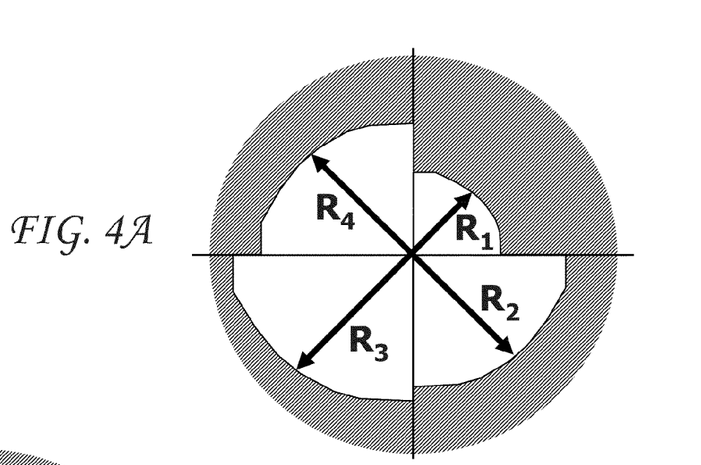
FIG. 4A is a graph illustrating a uniform assignment of four failure directions resulting in four broken shells defined by arcuate fail boundaries having different radii in accordance with one implementation of the present invention.

This integration requires angular coordinates for the boundaries of each slice ($a_i, b_i$), but this requirement can be avoided by assuming some knowledge about the distribution of the directions, for example if the directions are uniformly distributed then all of the failure directions are equiprobable. A simplified example of equiprobable failure directions is shown in FIG. 4A with four failure directions $R_1, R_2, R_3$, and $R_4$ in two dimensions (2-D). These failure directions define four radial slices whose angular widths are the same (90°). The four failure directions/slices have four respective fail boundaries at various radii from the origin of the parametric space (the nominal point of the system), and the fail regions appear as partial shells. In two and three dimensions the methodology of the present invention can thus be characterized by modeling the fail regions as a set of broken rings or broken spheres; this concept extends to higher dimensions as well. In this regard, those skilled in the art will appreciate that the term "radial slice" is not limited to a 2-D structure. For example, in 3-D a radial slice constructed in accordance with the present invention will appear generally pyramidal although its base will be curved (convex).

It can be seen that, for this example, the desired integral for a given fail region is accordingly one-fourth of the foregoing expression with closed integrals for the angular coordinates. More generally, for equiprobable (uniform) failure directions, the total failure probability comprising the sum of all of the integrated fail regions can be expressed as $$P_f = (1/nDir) \Sigma f(R_i)$$

where nDir is the number of failure directions, and now $$f(R_i) \propto \int_{R_i}^\infty \rho^{N-1} e^{-\frac{\rho^2}{2}} d\rho \cdot \oint \sin^{N-2}\varphi_1 \ldots \oint \sin\varphi_{N-2}.$$

This expression for the integration of a complete spherical shell is easy to represent analytically and can be derived a priori as a function of the number of dimensions. Table 1 lists the equivalent expressions for the first six dimensions, where "Erf" is the error function and "Γ(x, 0, a)" is the incomplete gamma function.

TABLE 1

| N Dimensions (# of variables) | Integral of Fail Region Shell |
|---|---|
| 1 | Erf(R√2) |
| 2 | $1 - e^{-(R^2)/2}$ |
| 3 | 2Γ(3/2, 0, R²/2) |

TABLE 1-continued

| N Dimensions (# of variables) | Integral of Fail Region Shell |
|---|---|
| 4 | $1 - e^{(-R^2/2)(1+(R^2)/2)}$ |
| 5 | $4\Gamma(5/2, 0, R^2/2)$ |
| 6 | $1 - e^{(-R^2/2)(1+(R^2)/2+(R^4)/8)}$ |

The invention preferably utilizes these formulae to build look-up tables which provide specific numeric values for different shell integrals based on the number of dimensions and selected values of R according to the particular variables under study. For example, a failure analysis of an SRAM memory cell might provide six dimensions corresponding to voltage thresholds for six transistors which make up the cell. The values of R represent vectors in sigma space. i.e., they are normalized and expressed in terms of $\sigma$. In some implementations the selected values of R may vary in the range of $0.2\sigma$-$8\sigma$. The look-up tables are stored with the computer program product of the present invention, e.g., on a hard disk drive of computer system 10. Those skilled in the art will appreciate that more complex integrals may also be pretabulated.

Different fail boundaries may define common shells, i.e., the radii of the arcs may be the same. For example, in FIGS. 4A and 4B the two fail boundaries for directions $R_2$ and $R_4$ have nearly the same radius, so only three integral solutions are necessary. The number of discrete shells (table entries) can accordingly be much smaller than the number of failure directions, which is dependent on the system itself, and it is also possible to simplify the process by using the shell closest to a given fail boundary for that calculation. Alternatively, nonlinear interpolation can be utilized with the tabulated form.

While it is a simple matter to uniformly place four failure directions in two dimensions, it can be more difficult to uniformly place large numbers of failure directions (say, thousands) in higher dimensions. One conventional technique to obtain nearly uniform directions for an N-dimensional unity sphere begins with a number of Gaussian-distributed points, wherein the number of points is equal to the number of desired directions (nDir). These points are then normalized to unity, whereby they become approximately uniformly distributed on the unit sphere. Further details may be found in the article by Mervin Muller entitled "A note on a method for generating points uniformly on n-dimensional spheres," Communications of the ACM, vol. 2, issue 4, pp. 19-20 (April 1959).

Figure 4B:
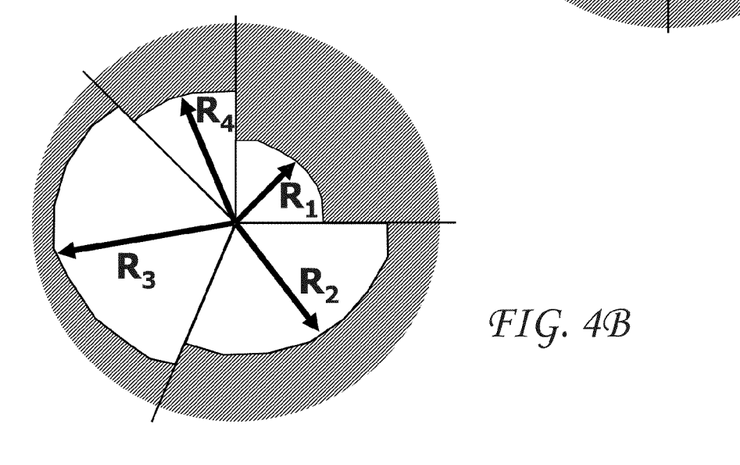
FIG. 4B is a graph illustrating a weighted assignment of four failure directions in accordance with one implementation of the present invention.

A further improvement may be made to the present invention by selectively providing different weights for the failure directions in order to provide a more accurate estimate of the failure probability. The weights represent relative likelihoods for failure modes associated with the failure directions. In graphical terms the weighting increases the angular width (volume) of a radial slice as illustrated in FIG. 4B for the simple example of four failure directions in two dimensions. The size of the fail region for direction $R_1$ is the same as in FIG. 4A, but the sizes of the fail regions for directions $R_2$ and $R_3$ are larger than in FIG. 4A (but still equal to each other), while the size for direction $R_4$ is smaller by half. The weights for $R_1$, $R_2$, $R_3$ and $R_4$ are accordingly $\frac{1}{4}$, $\frac{5}{16}$, $\frac{5}{16}$ and $\frac{1}{8}$.

A preferred method of generating the weights is to place a larger number of non-simulation directions in the parametric space under consideration. These non-simulation directions may be a simple Monte Carlo of a number of uniform directions from the nominal origin, without regard to pass/fail. For example, if there are 100 failure directions for a particular system model, the number of non-simulation directions might be around 2000 (with an accuracy to $\frac{1}{20}$th of the volume). Weights are then assigned according to the number of non-simulation directions that are close to a given failure direction divided by the total number of non-simulation directions. The largest dot product between a failure direction and a non-simulation direction can be used as a closeness metric. Other weighting formulations may be devised; for example it is possible to interpolate values along an non-simulated direction as opposed to matching it to the closest simulated direction failure bound. The total probability of failure for the system is then given as $$P_f = \Sigma[W_i \cdot f(R_i)]$$

where $W_i$ is the weight of each failure direction ($\Sigma W_i = 1$). Other statistical values useful to the designer can be derived from $P_f$, for example, the reliability index $-F^{-1}(P_f)$ in which F is the standardized cumulative normal distribution.

In an alternative implementation of the present invention, heuristic optimization is used to build a priori sets of refined uniform directions, and then weighting can be applied to improve the set. The heuristic optimizations may involve rejection-based sampling where directions with very small weights are removed and new directions are randomly added in the neighborhood of large weighted vectors. In another alternative implementation of the present invention, directional sampling techniques such as a Von Mises distribution can be used to focus on a critical fail region that requires more representation, or if a fail boundary is non-monotonic in a given neighborhood.

Figure 5:
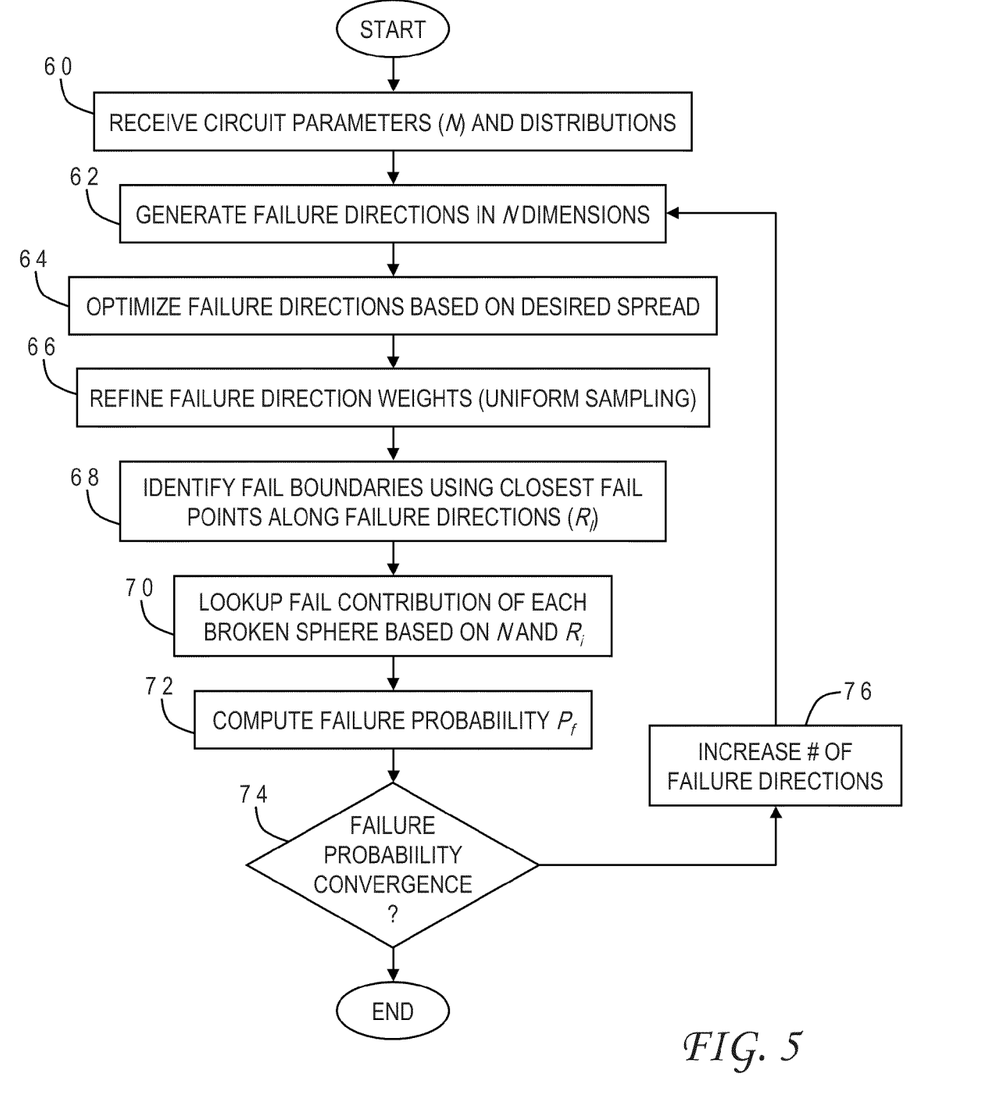
FIG. 5 is a chart illustrating the logical flow of failure probability computation for a system having multi-fail regions in accordance with one implementation of the present invention.

The present invention may be further understood with reference to the flow chart of FIG. 5 which illustrates a failure probability computation for a system having multi-fail regions in accordance with one implementation. The process begins by receiving input information on the system (60). For an electrical circuit such as a memory cell, this information includes the circuit parameters (process variations) of interest, e.g., voltage thresholds, and their distributions. It may be assumed that the distributions are Gaussian with input information thus including a mean and a standard deviation ($\sigma$) for each circuit parameter. A parametric space for the system model is defined wherein the number of dimensions N in the space is equal to the number of circuit parameters, and an initial set of failure directions is then generated for the parametric space (62). The starting number of fail directions preferably takes into consideration the value of N, i.e., as N increases it is expected that nDir will increase subject to reasonable simulation time which can be assessed by finding the nearest fraction volume covered or runtime limitation. In an example with six dimensions (N=6), the starting number of fail directions may be 1000. The initial set of directions can be uniform if there is no available system knowledge, or the failure directions may be optimized based on any desired direction of investigation (64) using prior knowledge of the system (e.g., fails being critical for a positive range of a certain variable, etc.).

The failure direction weights are then refined by uniform sampling using non-simulation directions (66). Fail boundaries for each failure direction are preferably identified using the closest failing point along each direction, i.e., the radius R for that slice (68). The closest failing point can be found by bisection methods. Passing/failing may be based on simulating the system in each direction and finding the closest failure point, or may be based on a model of the system, for example a plurality of input hyperplanes which characterize the failure modes. The contribution of each fail region is determined by lookup in the tables which provide values based on R (70). These values are combined with the respective weights to compute a total failure probability $P_f$(72). A determination is then made as to whether the computed failure probability is converging (74). Of course during the first iteration there is no convergence, so the number of failure directions is increased (76), and the process repeats at box 62. Once the failure probability meets the convergence criteria, for example when the estimate is within $0.2\sigma$ from the previous estimate (or once a predetermined computation limit is reached), the process is complete. The number of directions to be added is preferably equal in each round, in order to better evaluate for the same coverage whether the estimate is changing or not. It is also possible to focus more on regions where there is less coverage, or adopt any form of adaptive direction spreading techniques; for example, the process may elect to not simulate a given direction if it is close to an $8\sigma$ fail, but simulate a direction that is still close to a low sigma number of interest, say $4\sigma$, which might be critical for a given fail rate.

Figure 6:
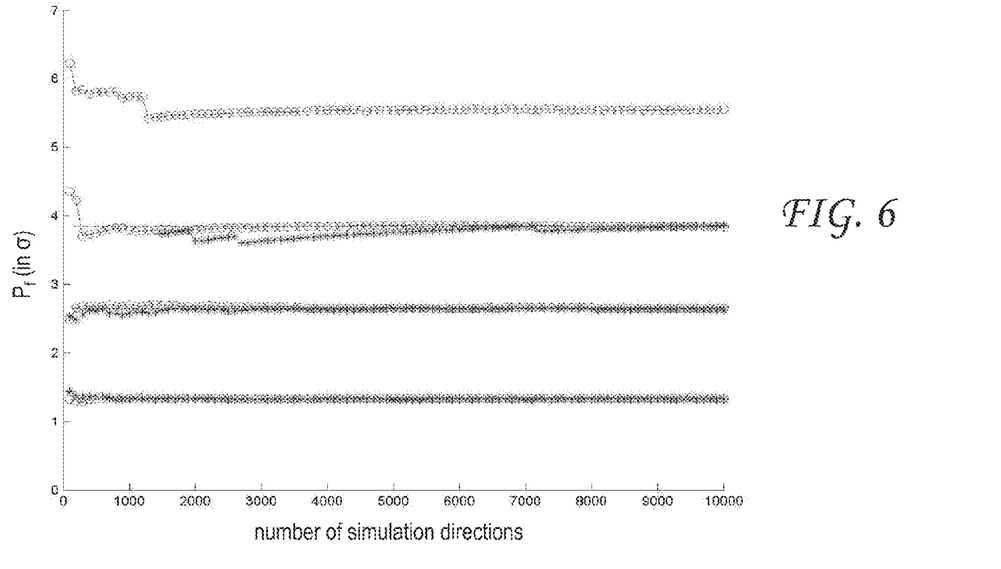
FIG. 6 is a graph in logarithmic scale illustrating an example of failure probability convergence with increasing numbers of failure directions in accordance with the present invention compared to non-convergence of a Monte Carlo analysis for the same number of evaluations, for the case of the failure region being bounded by sixteen hyperplane equations.
Figure 7:
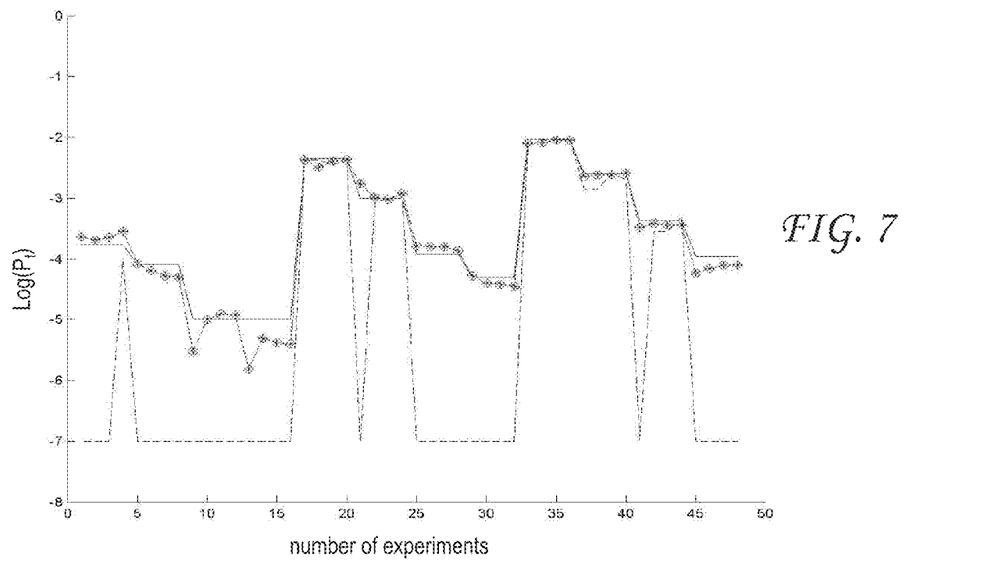
FIG. 7 is a graph in logarithmic scale illustrating examples of failure probability estimations for failure regions modeled by different numbers of hyperplane equations in accordance with the present invention compared to Monte Carlo estimations.

Comparisons of the present invention to Monte Carlo estimates may be understood with further reference to FIGS. 6 and 7. FIG. 6 is a graph of the estimated failure probability in terms of $\sigma$ ($3\sigma$ representing a 1% fail probability) as a function of the number of failure directions in the model (nDir=100, 500, 1000, 1500, ..., 10000). In this experimental setup the system is defined by eight circuit parameters (N=8), and fail boundaries are characterized by 16 hyperplanes. The data points shown as small circles represent estimates computed in accordance with the present invention. The data points shown as small stars represent estimates computed in accordance with a limited Monte Carlo analysis that uses the same number of simulations used for spherical estimation. It can be seen from these examples that the present invention provides a converging failure probability as the number of failure directions increases much faster than regular Monte Carlo. For the same amount of computational effort using the limited Monte Carlo, the estimates exhibit slower or no convergence.

FIG. 7 is a graph in logarithmic scale of the estimated failure probability (−1 corresponding to a $P_f$ of 0.1) as a function of the number of experiments. The experiments were setup to study the method of the present invention for different combinations of system model complexity, particularly in terms of the number of hyperplanes modeling the fail and how far those hyperplanes are from the origin, as well as the number of directions in the study. There are 48 experiments with different fail bounds (hyperplanes) that model the system. Experiments 1-16 represent a system modeled with 5 hyperplanes, experiments 17-32 represent the system modeled with 30 hyperplanes, and experiments 33-48 represent the system modeled with 64 hyperplanes. Within each of these experiment groups, there are four different sets of equations defining the hyperplanes. For example, experiments 1-4 and 5-8 have 5 hyper-plane equations to model the system but they have different probabilities of fail as the equations are selected randomly for each of those groups to model a random system. Finally, within an experiment subgroup (e.g., 1-4) the estimations are performed using the proposed methodology with 100, 500, 1000 and 1500 directions, respectively.

The solid line represents a full Monte Carlo analysis (100,000 samples). The data points shown as small circles again represent estimates computed in accordance with the present invention. The dashed line represents the limited Monte Carlo (using the same number of system simulations as the practiced invention). FIG. 7 illustrates how the full Monte Carlo is not able to accurately estimate fail probabilities lower than around $10^{-5}$. Limited Monte Carlo fails to even converge to the solution (−7 is used to replace log(0) in the plot), so in reality the limited Monte Carlo method did not properly estimate any of the failure probabilities because of the relatively small number of samples. Thus, even with the extra expense/computation of full Monte Carlo, it can still provide inferior results compared to the present invention.

The present invention accordingly provides a reliable and efficient method of analyzing failure probability for systems with multi-fail regions. The method allows for very fast estimates of fail boundaries and fail probabilities, with much of the calculations performed a priori. The broken-spheres methodology also advantageously provides for the direct formulation of failure probabilities.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer-implemented method for determining a failure probability of a system having one or more failure modes associated with a plurality of system parameters, the method comprising:
   generating a plurality of failure directions in a parametric space, the parametric space having dimensions corresponding to the system parameters, each failure direction having an associated radial slice by executing first instructions in a computer system;
   identifying fail boundaries for each of the radial slices with broken shell regions extending beyond the fail boundaries by second executing instructions in the computer system;
   integrating a distribution of the system parameters across the broken shell regions to derive a failure contribution for each failure direction by third executing instructions in the computer system; and
   computing the failure probability as a sum of the failure contributions by executing fourth instructions in the computer system.

2. The method of claim 1 wherein the radial slices have uniform angular dimensions.

3. The method of claim 1 wherein the failure directions are selectively weighted for the failure probability computation.

4. The method of claim 3 wherein weights are assigned to the failure directions by:
   randomly placing a plurality of non-simulation directions in the parametric space;
   determining which of the failure directions is close to a given non-simulation direction; and
   computing the weight of a given failure direction as a number of close non-simulation directions divided by a total number of non-simulation directions.

5. The method of claim 1 wherein:
   said integrating uses equivalent expressions to solve the integral $$f(R_i) \propto \int_{R_i}^{\infty} \rho^{N-1} e^{-\frac{\rho^2}{2}} d\rho \cdot \oint \sin^{N-2}\varphi_1 \ldots \oint \sin\varphi_{N-2}$$

where $f(R_i)$ is the failure contribution, $R_i$ is the normalized distance from a nominal origin of the parametric space to the fail boundary of a given radial slice, N is dimensions of the parametric space, ρ is a radial coordinate of the parametric space, and $\phi_1, \ldots, \phi_{N-2}$ are angular coordinates of the parametric space.

6. The method of claim 5 wherein said integrating further uses a look up table having entries for $f(R_i)$ according to the equivalent expressions based on different values of N and $R_i$.

7. The method of claim 1, further comprising iteratively repeating said generating, identifying, integrating and computing with successively increasing failure directions until the failure probability converges.

8. The method of claim 1 wherein:
the system is an electrical circuit; and
the system parameters are threshold voltages for devices in the electrical circuit.

9. A computer system comprising:
one or more processors which process program instructions;
a memory device connected to said one or more processors; and
program instructions residing in said memory device for determining a failure probability of a system having one or more failure modes associated with a plurality of system parameters, by generating a plurality of failure directions in a parametric space whose dimensions correspond to the system parameters, each failure direction having an associated radial slice, identifying fail boundaries for each of the radial slices with broken shell regions extending beyond the fail boundaries, integrating a distribution of the system parameters across the broken shell regions to derive a failure contribution for each failure direction, and computing the failure probability as a sum of the failure contributions.

10. The computer system of claim 9 wherein the radial slices have uniform angular dimensions.

11. The computer system of claim 9 wherein the failure directions are selectively weighted for the failure probability computation.

12. The computer system of claim 11 wherein weights are assigned to the failure directions by:
randomly placing a plurality of non-simulation directions in the parametric space;
determining which of the failure directions is close to a given non-simulation direction; and
computing the weight of a given failure direction as a number of close non-simulation directions divided by a total number of non-simulation directions.

13. The computer system of claim 9 wherein:
said integrating uses equivalent expressions to solve the integral $$f(R_i) \propto \int_{R_i}^{\infty} \rho^{N-1} e^{-\frac{\rho^2}{2}} d\rho \cdot \oint \sin^{N-2}\varphi_1 \ldots \oint \sin\varphi_{N-2}$$

where $f(R_i)$ is the failure contribution, $R_i$ is the normalized distance from a nominal origin of the parametric space to the fail boundary of a given radial slice, N is dimensions of the parametric space, ρ is a radial coordinate of the parametric space, and $\phi_1, \ldots, \phi_{N-2}$ are angular coordinates of the parametric space.

14. The computer system of claim 13 wherein said integrating further uses a look up table having entries for $f(R_i)$ according to the equivalent expressions based on different values of N and $R_i$.

15. The computer system of claim 9 wherein said program instructions further iteratively repeat said generating, identifying, integrating and computing with successively increasing failure directions until the failure probability converges.

16. The computer system of claim 9 wherein:
the system is an electrical circuit; and
the system parameters are threshold voltages for devices in the electrical circuit.

17. A computer program product comprising:
a computer-readable storage medium; and
program instructions residing in said storage medium for determining a failure probability of a system having multiple failure modes associated with a plurality of system parameters, by generating a plurality of failure directions in a parametric space whose dimensions correspond to the system parameters, each failure direction having an associated radial slice, identifying fail boundaries for each of the radial slices with broken shell regions extending beyond the fail boundaries, integrating a distribution of the system parameters across the broken shell regions to derive a failure contribution for each failure direction, and computing the failure probability as a sum of the failure contributions.

18. The computer program product of claim 17 wherein the radial slices have uniform angular dimensions.

19. The computer program product of claim 17 wherein the failure directions are selectively weighted for the failure probability computation.

20. The computer program product of claim 19 wherein weights are assigned to the failure directions by:
randomly placing a plurality of non-simulation directions in the parametric space;
determining which of the failure directions is close to a given non-simulation direction; and
computing the weight of a given failure direction as a number of close non-simulation directions divided by a total number of non-simulation directions.

21. The computer program product of claim 17 wherein:
said integrating uses equivalent expressions to solve the integral $$f(R_i) \propto \int_{R_i}^{\infty} \rho^{N-1} e^{-\frac{\rho^2}{2}} d\rho \cdot \oint \sin^{N-2}\varphi_1 \ldots \oint \sin\varphi_{N-2}$$

where $f(R_i)$ is the failure contribution, $R_i$ is the normalized distance from a nominal origin of the parametric space to the fail boundary of a given radial slice, N is dimensions of the parametric space, ρ is a radial coordinate of the parametric space, and $\phi_1, \ldots, \phi_{N-2}$ are angular coordinates of the parametric space.

22. The computer program product of claim 21 wherein said integrating further uses a look up table having entries for $f(R_i)$ according to the equivalent expressions based on different values of N and $R_i$.

23. The computer program product of claim 17 wherein said program instructions further iteratively repeat said generating, identifying, integrating and computing with successively increasing failure directions until the failure probability converges.

24. The computer program product of claim 17 wherein:
the system is an electrical circuit; and
the system parameters are threshold voltages for devices in the electrical circuit.

25. A method of determining a failure probability of a memory cell circuit having multiple failure modes associated with a plurality of circuit parameters, the method comprising:

generating a plurality of uniform failure directions in a parametric space, the parametric space having dimensions N corresponding to the system parameters by executing first instructions in a computer system;

establishing respective weights $W_i$ for the failure directions by executing second instructions in the computer system;

calculating normalized distances $R_i$ from a nominal origin of the parametric space to closest failing points along the failure directions by executing third instructions in the computer system;

selecting failure contribution values $f(R_i)$ for the failure directions from a lookup table whose entries are solutions for specific values of N and $R_i$ to equivalent expressions of $$f(R_i) \propto \int_{R_i}^{\infty} \rho^{N-1} e^{-\frac{\rho^2}{2}} d\rho \cdot \oint \sin^{N-2}\varphi_1 \ldots \oint \sin\varphi_{N-2}$$

where $\rho$ is a radial coordinate of the parametric space, and $\phi_1, \ldots, \phi_{N-2}$ angular coordinates of the parametric space by executing fourth instructions in the computer system;

computing the failure probability as $P_f = \Sigma[W_i \cdot f(R_i)]$ by executing fifth instructions in the computer system; and iteratively repeating said generating, establishing, calculating, selecting and computing with successively increasing failure directions until the failure probability $P_f$ converges.

* * * * *